(12) United States Patent
Ganev

(10) Patent No.: US 7,002,317 B2
(45) Date of Patent: Feb. 21, 2006

(54) MATCHED REACTANCE MACHINE POWER-GENERATION SYSTEM

(75) Inventor: Evgeni Ganev, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 42 days.

(21) Appl. No.: 10/779,720

(22) Filed: Feb. 18, 2004

(65) Prior Publication Data

US 2005/0179418 A1     Aug. 18, 2005

(51) Int. Cl.
  *H02P 8/00*     (2006.01)
(52) U.S. Cl. .................. 318/701; 318/727; 318/801; 322/90; 322/94; 363/127
(58) Field of Classification Search ........... 318/720, 318/721, 727, 801; 322/28, 36, 38, 90, 94
  See application file for complete search history.

(56) References Cited

U.S. PATENT DOCUMENTS

| | | | |
|---|---|---|---|
| 5,245,238 A | 9/1993 | Lynch et al. ............... 310/116 |
| 5,254,936 A | 10/1993 | Leaf et al. .................... 322/90 |
| 5,587,641 A * | 12/1996 | Rozman ..................... 318/801 |
| 5,764,036 A * | 6/1998 | Vaidya et al. ................. 322/90 |
| 5,936,386 A * | 8/1999 | Heglund ...................... 322/94 |
| 6,087,750 A | 7/2000 | Raad .......................... 310/152 |
| 6,900,997 B1 * | 5/2005 | Perreault et al. ........... 363/127 |
| 2002/0176266 A1 | 11/2002 | Perreault et al. |
| 2003/0007371 A1 | 1/2003 | Kawazoe et al. |
| 2003/0062870 A1 * | 4/2003 | Royak et al. ............... 318/727 |

* cited by examiner

*Primary Examiner*—Paul Ip
(74) *Attorney, Agent, or Firm*—Oval Caglar, Esq

(57) ABSTRACT

A system and method is described for using a matched reactance machine power generation system (MRMPGS) to provide a constant-voltage power for an electric distribution system. The system and method include a permanent magnet rotor type machine without a field winding for excitation. This type of machine presents much better reliability, as the excitation of the machine is fixed and achieved by a permanent magnet embedded in the rotor assembly. The voltage regulation is achieved through speed and load coordination that is based on a machine reactance specially selected and calculated to achieve compensation between the external voltage variation and the internal machine voltage drop, resulting in substantial savings in electronics hardware.

13 Claims, 5 Drawing Sheets

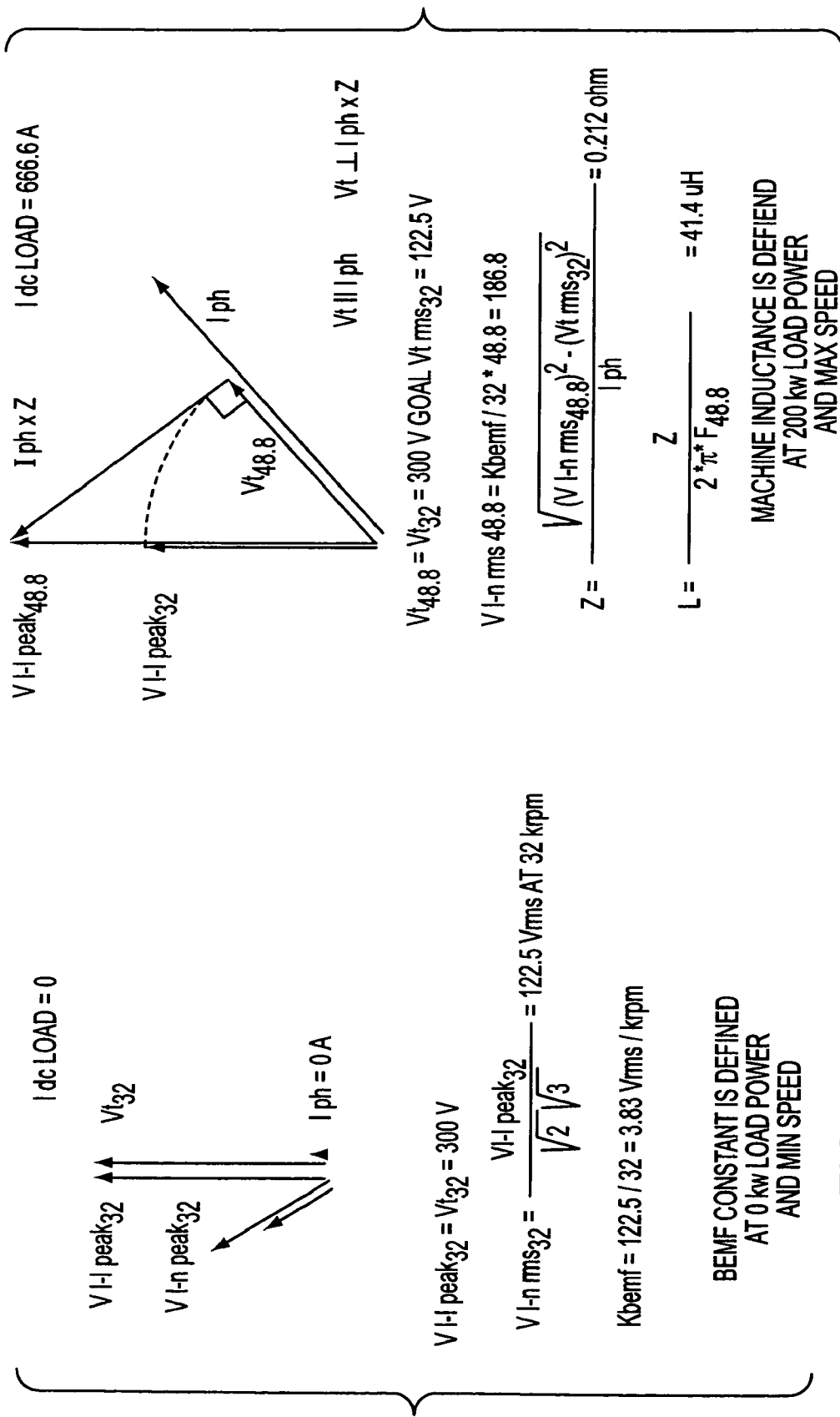

48.8 krpm SPEED

MATCHED REACTANCE MACHINE POWER-GENERATION SYSTEM

FIELD OF THE INVENTION

The present invention relates to a system and method for a matched reactance machine power generation system (MRMPGS). The MRMPGS provides a constant-voltage DC power for an electric power distribution system wherein the constant voltage is achieved through speed and load coordination based on a machine reactance that is specially selected and calculated to achieve compensation between the external voltage variation and the internal machine voltage drop, resulting in substantial savings in electronics hardware. The system and method use a synchronous permanent magnet rotor machine without an active power electronics conditioner, thereby creating a substantial savings in electronics hardware.

BACKGROUND OF THE INVENTION

In a traditional prime mover system, one goal of the engine, gearbox and generator is to provide a DC distribution system that can maintain a terminal voltage in a relatively narrow range. At the same time, the prime mover should operate at a variable speed in order to have fuel-efficient performance. With a conventional salient pole synchronous machine (i.e. wound-rotor machine), the excitation system and a conventional three-phase (i.e. six pulse) rectifier provide this capability. However, the wound-rotor system configuration is incompatible with high-speed prime movers without a gear-reduction stage. Therefore, a gear-less-oilless system is not attainable. Also, such a wound-rotor machine has poor reliability and low efficiency.

In contrast, the rotor construction of permanent magnet (PM) generators is robust and allows for high-speed operation, but excitation by definition is fixed. Therefore, a full-scale three-phase bridge or active power electronics with similar complexity is required in order to condition the variable-voltage power provided by the PM machine. However, three-phase switching bridges are very expensive for high-power applications. They also present reduced reliability and increased volume and weight, and the losses in the switching devices can be substantial.

One solution to providing regulated voltage using a PM machine is described in U.S. Pat. No. 5,245,238 issued to Lynch et al., the entire content of which is incorporated herein by reference. As noted in the Lynch Patent, an axial air gap permanent magnet generator having more than one rotor or stator is provided. The voltage regulation in this generator is achieved by controlling the mutual position between multiple rotors or multiple stators using some form of actuation. The requirement for multiple rotors or multiple stators with mutual position change however increases the complexity of the generator and reduces reliability. The need for additional actuation hardware further adds to the complexity of the system.

Still another solution including the use of permanent magnet generators is described in U.S. Pat. No. 6,087,750 issued to Bernard Raad, the entire content of which is incorporated herein by reference. The Raad Patent discloses the use of a permanent magnet generator for a very specific application that restricts diametrical space, such as oil exploration wells, and the type of machine described is of an axial air gap type only. In addition to the main generator windings, there are two more windings used for regulation of the output voltage, which, in the generator disclosed in the Raad Patent, is achieved in two ways. First, the regulation coil acts by saturating the iron core with DC flux whenever the output voltage exceeds a pre-selected limit due to variations in load and speed. The regulation coil creates a flux which is opposed to that of the magnetic field assembly. Secondly, the regulation coil also regulates the output voltage by acting as an added load on the main power output of the generator.

In the Raad Patent, the regulation coils are placed in the air gap between the magnet rotor and the stator teeth of the iron core. However, a larger air gap makes electric machine optimization of any kind more difficult, and larger size and weight are expected. Also, the regulation coil of the Raad Patent produces saturation of the armature. Operating points with saturation lead to poor utilization of the armature material, therefore further penalty to machine weight and volume is paid.

Still another permanent magnet power supply system is described in U.S. Pat. No. 5,254,936, issued to Leaf et al., the entire content of which is incorporated herein by reference. In the Leaf Patent, a dual generator system is shown wherein a pair of generators supply current to a common electrical load. The electric machine used in the Leaf Patent includes a field winding for excitation, therefore, the voltage regulation is achieved by controlling the current in the field winding. However, machines with such excitation windings are not suitable for direct integration with high-speed prime movers such as turbine engines. This is due primarily to structural limitations of the rotor.

Accordingly, a need exists for a PM machine which can provide constant DC voltage at variable prime mover speeds without using costly power electronics or adding to overall machine cost, weight and complexity.

SUMMARY OF THE PREFERRED EMBODIMENTS

An object of the present invention therefore is to provide a system and method for a PM machine which can provide constant voltage at variable prime mover speeds without using costly power electronics or adding to overall machine cost, weight and complexity.

Another object of the present invention is to provide a system and method for selecting a PM synchronous machine based upon back electromotive force (BEMF) calculations.

Another object of the present invention is to provide a system and method for selecting a PM synchronous machine based upon machine inductance calculations.

Another object of the present invention is to provide a system and method for using a PM synchronous machine having selected values for BEMF and machine inductance where the result is a constant output voltage when the prime mover speed is coordinated with the current demand of the system.

Still another object of the present invention is to provide a system and method to satisfy DC power generation without using costly power electronics for AC/DC conversion.

These and other objects are substantially achieved by providing a system and method for a matched reactance machine power generation system (MRMPGS) that provides a constant-voltage DC power for an electric power distribution system. The constant voltage is achieved at variable prime mover speeds for optimal fuel consumption implementation and uses a synchronous PM rotor machine without an active power electronics conditioner. The required BEMF constant for the PM machine can be calculated based on the line-to-line peak voltage of the BEMF which has the same amplitude of the terminal voltage at low speeds. The required PM machine inductance L can be calculated from the machine reactance and the corresponding frequency at high speeds, as the terminal voltage and the phase current are in phase. Therefore the terminal voltage vector and the internal machine voltage drop are perpendicular and solving the vector diagram can be used to define the machine reactance.

BRIEF DESCRIPTION OF THE DRAWINGS

These and other objects, advantages and novel features of the invention will be more readily appreciated from the following detailed description when read in conjunction with the accompanying drawings, in which:

FIG. 3 is a vector diagram illustrating an example of a BEMF constant calculation at 0 kW load power and minimum speed in accordance with an embodiment of the present invention;

FIG. 4 is a vector diagram illustrating an example of a machine inductance calculation at 200 kW load power and maximum speed in accordance with an embodiment of the present invention;

DETAILED DESCRIPTION OF THE PREFERRED EMBODIMENTS

The embodiment of the present invention described below provides a system and method for using a synchronous permanent magnet (PM) rotor machine for power generation without requiring an active power electronics conditioner. Using a novel matched reactance machine power generation system (MRMPGS) provides a constant-voltage DC power for an electric power distribution system, and with the introduction of the MRMPGS, the capability of the PM machine can be extended to cover the variable-speed constant-voltage DC power-generation system with a simple bridge rectifier.

To satisfy the requirements of a matched reactance machine system in accordance with an embodiment of the present invention, a PM machine with a specially selected back electromotive force (BEMF) and machine inductance is required. As known to those skilled in the art, the magnetic flux in a PM machine is provided by permanent magnets embedded in the rotor assembly. The value of the BEMF is dependent upon the flux produced by the field and the armature speed.

In the matched reactance machine system of the embodiment described below, at a low or minimum speed the terminal voltage of the machine is selected to be equal to the BEMF, with each having the same amplitude and a phase difference of zero. The output DC voltage is therefore equal to the line-to-line peak voltage of the BEMF. The required BEMF constant for the PM machine can be calculated based on this detail.

At a high or maximum speed, the BEMF is increased proportionally with the speed and the internal machine reactance compensates for this increase. The terminal voltage and the phase current are in phase, therefore, the terminal voltage vector and the internal machine voltage drop are perpendicular. Solving the vector diagram defines the machine reactance for the PM machine. The required PM machine inductance L is calculated from the machine reactance and the corresponding frequency. The result is a constant output voltage when the prime mover speed is coordinated with the current demand of the system. The following example is presented to illustrate the calculations and implementation of the embodiment of the present invention described above.

Figure 1:
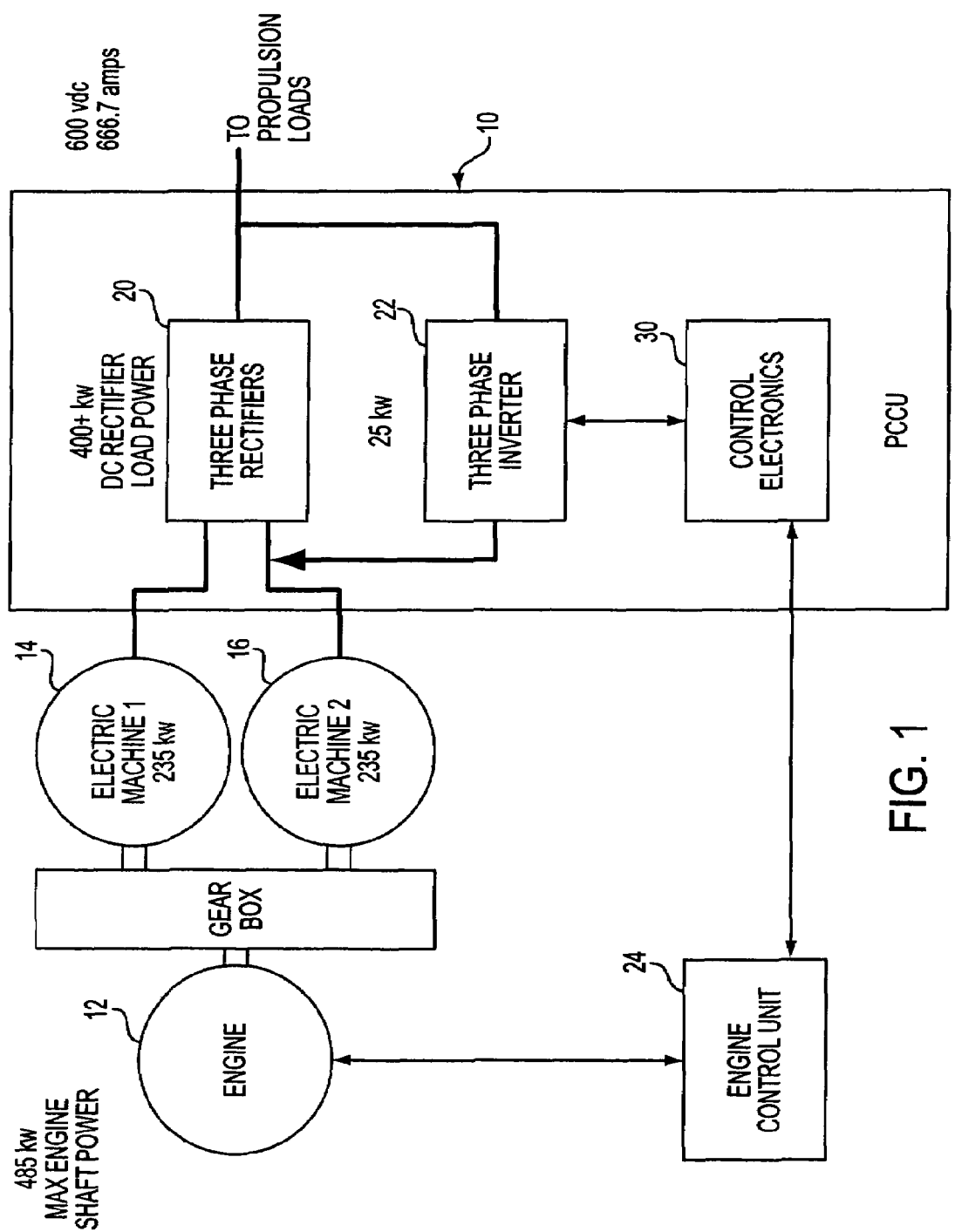
FIG. 1 is a block diagram illustrating an example of a system architecture for a power generation system in accordance with an embodiment of the present invention.

FIG. 1 shows a block diagram of a power-generation system which uses hybrid electric architecture. In diagram 10, an engine 12 is shown integrated with two electric machines 14 and 16, such as a PM synchronous machine, via a gear box 18. Each machine 14 and 16 is electrically coupled with a propulsion load (not shown) via a three phase rectifier 20. A three phase inverter 22 is coupled in parallel with the three phase rectifier 20, and is further electrically coupled with a set of control electronics 30. The control electronics 30 are in communication with the engine control unit 24 and the three-phase inverter 22.

The engine 12 drives the two electric machines, and the AC power generated by the machines is converted to DC power using the simple bridge rectifier 20 for reduced cost, volume and weight. Provisions for self-start of the system are also provided.

In the system of FIG. 1, the engine control unit 24 operates the engine 12 for optimized fuel efficiency. In the example shown, the speed at zero delivered power is approximately 32.0 krpm, and the speed at maximum delivered power is approximately 48.8 krpm. These values are presented as examples, and still other values can exist where parameters are changed for the specific application.

Figure 2:
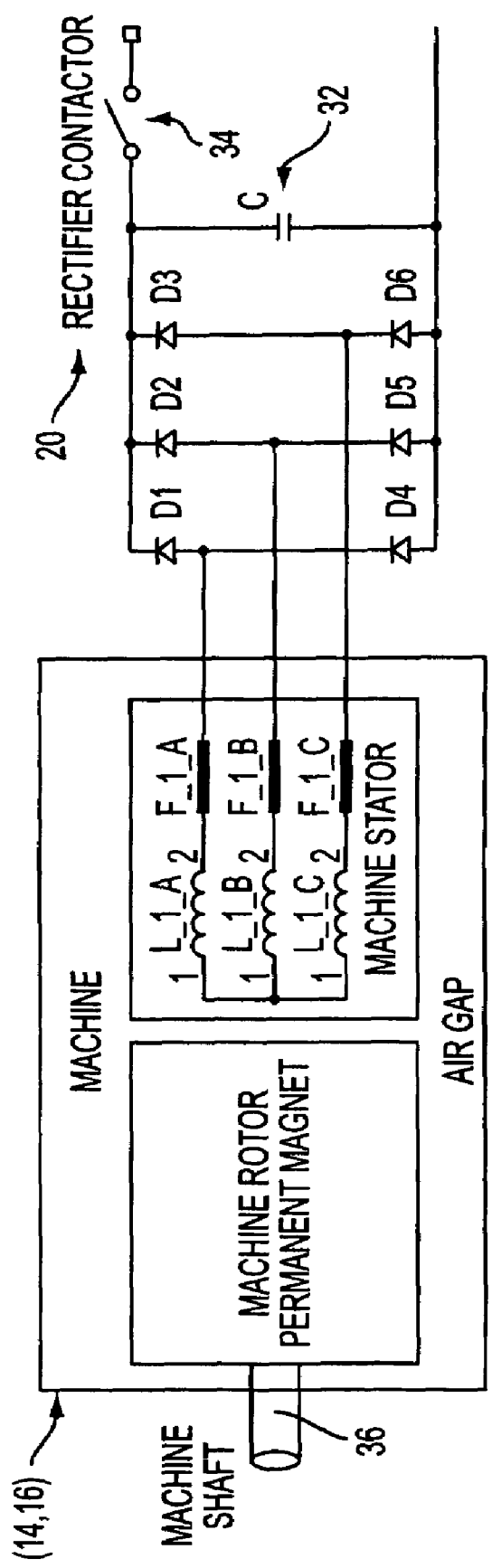
FIG. 2 is a block diagram illustrating an example power topology of MRMPGS in accordance with an embodiment of the present invention.

FIG. 2 illustrates a portion of the generation system of FIG. 1, including one PM synchronous generator 14 or 16, and rectifier 20. In FIG. 2, additional elements of the rectifier 20 are shown, including a filtering capacitor 32 and a rectifier contactor 34. The machine shaft 36 of the PM synchronous generator is coupled with the engine shaft (not shown) of engine 12 and operates with variable speeds from approximately 32.0 krpm at zero load to approximately 48.8 krpm at 200 kW load. During the entire speed range, the output voltage of the rectifier, or terminal voltage, is approximately 300 Vdc. The current at low speed (i.e. 32 krpm) is approximately zero, and the current at maximum speed (i.e. 48.8 krpm) is approximately 666.666 A. The engine speed as directed by the engine control unit 24 follows machine power and current demands in order to optimize the fuel efficiency.

To satisfy the above requirements, PM machines 14 and 16 are provided having specially selected BEMF and machine inductance characteristics. FIGS. 3 and 4 illustrate example calculations used to select such a PM machine for use in accordance with an embodiment of the present invention described above. FIG. 3 shows a vector diagram for system operation at low speed (i.e. 32 krpm) where the current delivered to the distribution system is zero or close to zero. At this speed, the terminal voltage of the machine is equal to the BEMF and each has the same amplitude and the phase difference is zero. Therefore the output DC voltage (i.e. 300 V) is equal to the line-to-line peak voltage of the BEMF.

As noted above, the value of the BEMF is dependent upon the flux produced by the field and the armature speed of the machine. The flux is provided by the permanent magnets and as the armature rotates the BEMF is induced in the stator winding. The BEMF constant required for the PM machine is calculated based on this detail and is shown below in Equations (1) through (3).

In Equation (1), at 32 krpm the terminal voltage Vt of the machine is equal to the line-to-line peak voltage V(line-line) peak of the BEMF and the output DC voltage (i.e. 300 V).

$$V(\text{line-line})\text{peak}_{32} = Vt_{32} = 300V \quad (1)$$

This result can be used in Equations (2) and (3) below to determine a desired value for Kbemf of the PM machine, as the BEMF is dependent upon the flux produced by the field and the armature speed of the machine.

$$V(\text{line}-\text{neutral})\text{rms}_{32} = \frac{V(\text{line}-\text{line})peak_{32}}{\sqrt{2}\sqrt{3}} = 122.5 \text{ Vrms} \quad (2)$$

$$Kbemf = \frac{122.5}{32} = \frac{3.83 \text{ Vrms}}{\text{krpm}} \quad (3)$$

FIG. 4 shows a vector diagram of system operation at high speed (i.e. 48.8) krpm where 200 kW (i.e. 666.6 A) is delivered to a distribution bus (not shown) with a goal to maintain the same DC voltage of 300 v as shown in FIG. 3. In FIG. 4, the BEMF is increased proportionally with the speed, as the BEMF is dependent upon the armature speed of the machine. Additionally, the terminal voltage and the phase current are in phase. Therefore, the terminal voltage vector and the internal machine voltage drop are perpendicular, and solving the vector diagram for Z yields the machine reactance. The machine inductance L can then be calculated from the calculated Z reactance and the corresponding frequency as shown in Equations (4) through (7) below.

In Equations (4A) and (4B), a goal to maintain the same DC voltage of 300V is shown as in FIG. 3.

$$Vt_{48.8} = Vt_{32} = 300 \; VGoal \quad (4A)$$

or, $$Vtrms_{32} = 122.5 \text{ V} \quad (4B)$$

$$V(\text{line}-\text{neutral})\text{rms}_{48.8} = \frac{Kbemf}{32 \times 48.8} = 186.8 \text{ V} \quad (5)$$

Where the terminal voltage and the phase current are in phase, the resistive component of the machine reactance is zero. Therefore, the terminal voltage vector and the internal machine voltage drop are perpendicular, and solving the vector diagram for Z in Equation (6) yields the machine reactance.

$$Z = \frac{\sqrt{(V(\text{line}-\text{neutral})\text{rms}_{48.8})^2 - (Vtrms_{32})^2}}{Iph} = 0.212 \text{ ohms} \quad (6)$$

The desired machine inductance L can then be calculated from the calculated Z reactance and the corresponding frequency as shown in Equation (7).

$$L = \frac{Z}{2 \times \pi \times F_{48.8}} = 41.4 \text{ uH} \quad (7)$$

Figure 5:
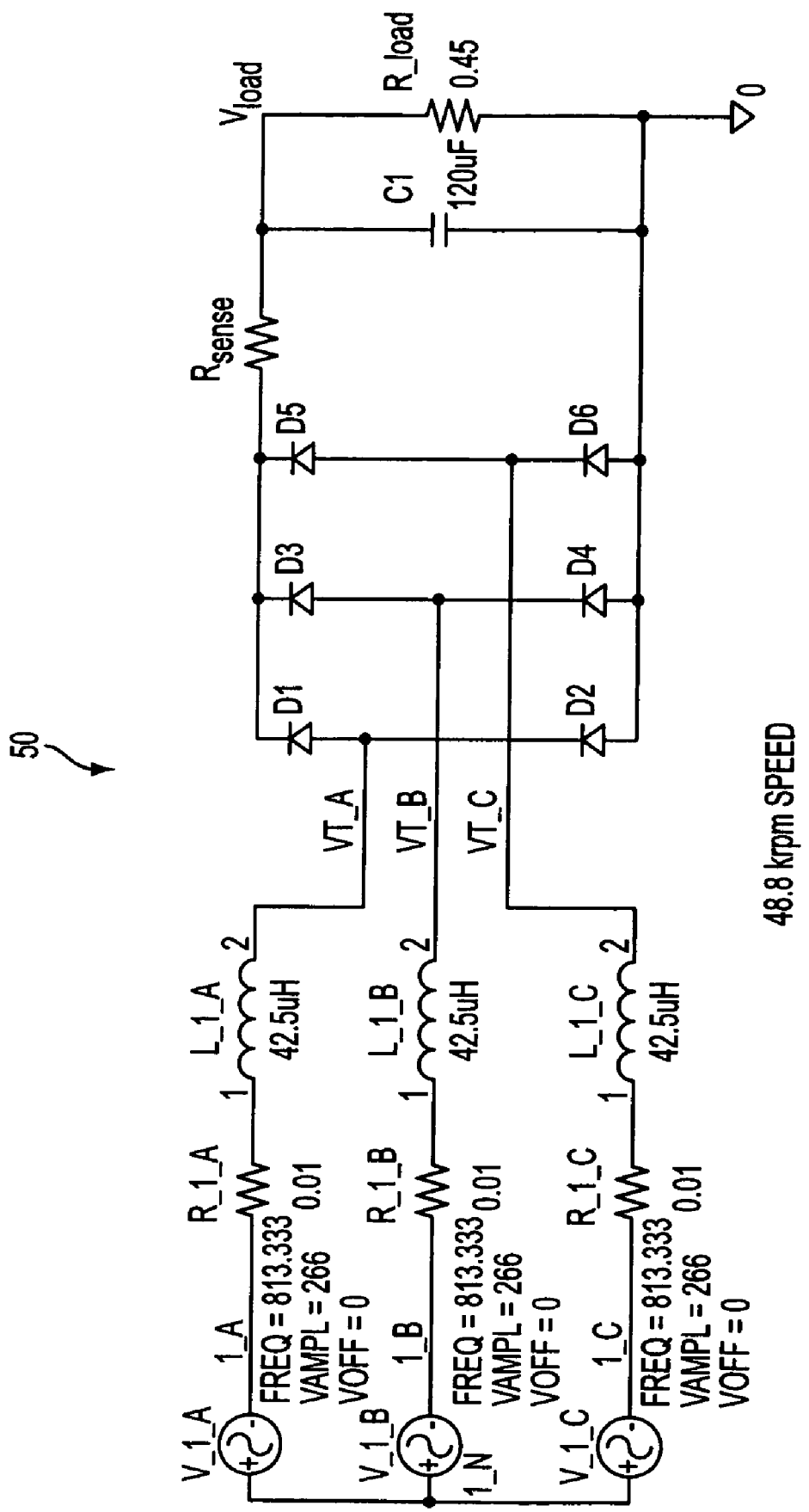
FIG. 5 is a PSpice simplified simulation model in accordance with an embodiment of the present invention.

An example of the performance of the embodiment described above is shown in resulting FIGS. 5, 6A, 6B and 7. A simulation using the PSpice™ simulation software can be used to verify the concept for the MRMPGS described above. The PSpice model 50 of an embodiment of the present invention shown in FIG. 5 provides parallel calculations and accounts for machine electrical parameters and realistic diode parameters for a circuit representation of a system as calculated above and shown in FIG. 2. Once determined, a steady-state simulation can be produced and the results evaluated.

Figure 6A:
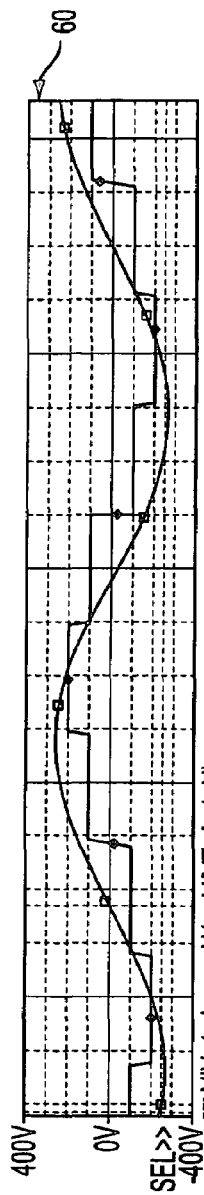
FIG. 6A is a PSpice simulation result for BEMF voltage and machine terminal voltage at 48.8 krpm speed in accordance with an embodiment of the present invention.
Figure 6B:
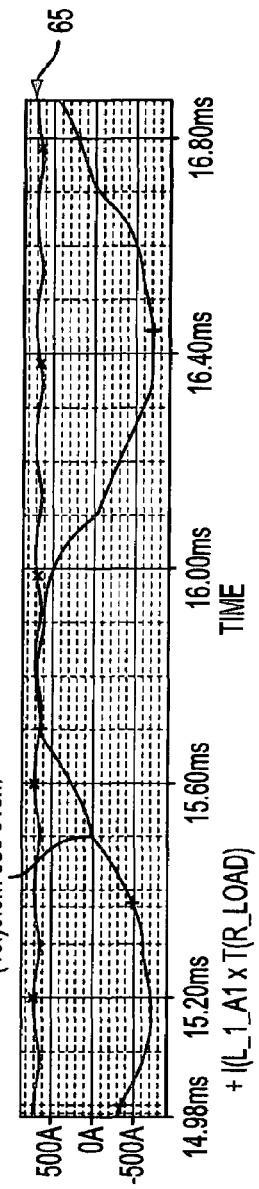
FIG. 6B is a PSpice simulation result for the electric machine phase current and DC load current at 48.8 krpm speed in accordance with an embodiment of the present invention.
Figure 7:
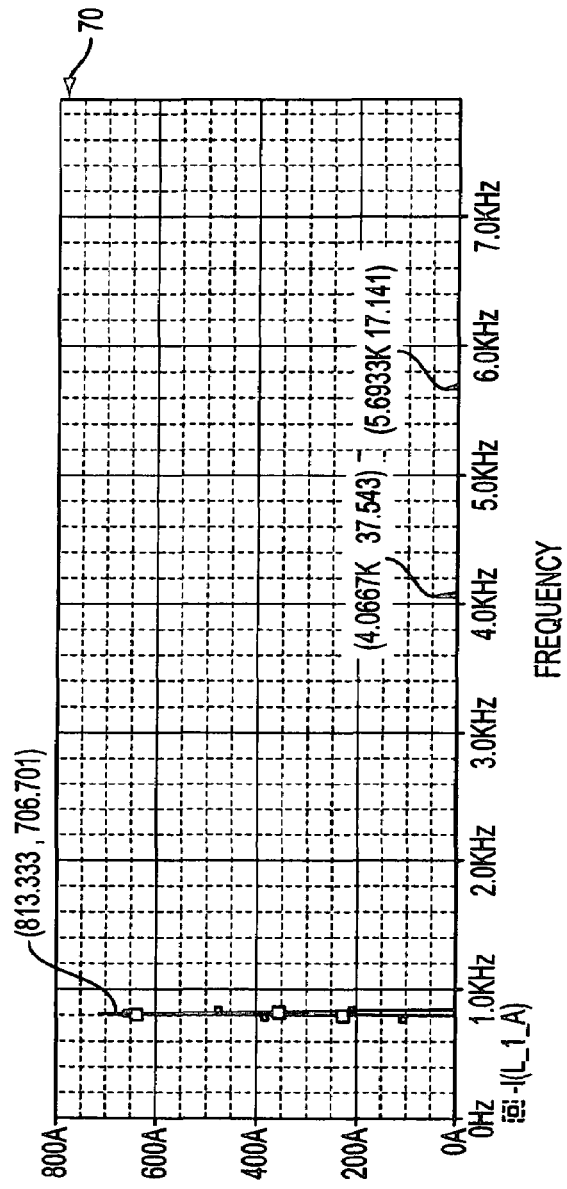
FIG. 7 is a PSpice simulated machine phase current spectrum plot in accordance with an embodiment of the present invention.

FIGS. 6A and 6B show the steady-state simulation results for the 48.8 krpm speed and maximum power in plots 60 and 65, and Table 1, described in greater detail below, summarizes the simulation results for five operating points. FIG. 7 shows the spectrum of the machine phase current at maximum power in plot 70.

Additional values for the embodiment described above includes a value for BEMF within a range from 122.5 Vrms to 186.8 Vrms line to neutral (1-n), which does not present stress on the insulation system of the machine. The terminal voltage of the machine does not exceed 122.5 Vrms 1-n, and the inductance of the machine is within a range of 42 uH, which does not present any difficulties for a such size machine.

FIG. 6A is a PSpice simulation result for the BEMF voltage and the machine terminal voltage at 48.8 krpm in accordance with an embodiment of the present invention. FIG. 6B is a PSpice simulation result of the electric machine phase current and the DC load current at 48.8 krpm in accordance with an embodiment of the present invention. As noted in FIGS. 6A and 6B, the machine current wave shape is close to sinusoidal and includes only minimal harmonics of any significance, specifically, $5^{th}$ and $7^{th}$ harmonics. With a relatively low value for the DC link capacitor 32 (i.e. 120 $\mu$F), the $5^{th}$ harmonic is about 5%, and the $7^{th}$ harmonic is about 2% of the fundamental current value, therefore total harmonic distortion (THD) of the current remains quite low. Also, where these values exist, machine steel loss is low when compared to a machine with more conventional (i.e. lower) reactance.

Table 1 below is an example simulation result summary. Using the results provided by Equations (1) through (7), the MRMPGS provides a substantially constant DC Bus Load Voltage for an electric power distribution system within a DC Bus Load Power range and a speed range.

TABLE 1

| | | Two-Pole PM machine requirements | | | | |
|---|---|---|---|---|---|---|
| DC Bus Load | % | 0 | 25 | 50 | 75 | 100 |
| DC Bus Load Power | kW | 0 | 50 | 100 | 150 | 200 |
| DC Bus Load Voltage | Vdc | 300 | 297 | 302 | 300 | 300 |
| DC Bus Load Current | Amps | 0.3 | 168.4 | 331.1 | 500.0 | 666.7 |
| Engine Speed | krpm | 32.0 | 36.2 | 40.4 | 44.6 | 48.8 |

TABLE 1-continued

| | | Two-Pole PM machine requirements | | | | |
|---|---|---|---|---|---|---|
| Machine Frequency | Hz | 533.3 | 603.3 | 673.3 | 743.3 | 813.3 |
| Emf PH to N rms | V | 122.6 | 138.6 | 154.7 | 170.8 | 186.9 |
| DC Load Resistance | Ohm | ∞ | 1.764 | 0.912 | 0.600 | 0.450 |
| Max Speed | krpm | 48.8 | | | | |
| Min Speed | krpm | 32.0 | | | | |
| Back emf Constant | V/krpm | 3.83 | | | | |
| Inductance PH to N | uH | 42.5 | | | | |
| DC bus Filter capacitor | uF | 120 | | | | |

The matched reactance machine short circuit current is independent of the machine speed and is approximately twice the rated current, which is convenient for implementing short circuit protection. The Table 1 shows that the DC supply voltage remains constant and the machine power factor is close to unity for the entire speed and power range, therefore losses are minimized for both the PM machines 14 and 16, and the semiconductor rectifier 20.

The matched reactance machine power-generation system of the embodiment described above therefore provides a constant-voltage output for the entire electric load range with a variable speed engine operation. The capability of the PM machine is extended to cover the variable-speed, constant-voltage DC power-generation system with the addition of a simple bridge rectifier. At the same time, a simple conventional diode rectifier can be used and the system can allow for a gearless-oilless integration.

The MRMPGS of the embodiment described above provides an optimized solution for several applications. For example, where a twin-pack concept is implemented, that is, a system having two separate 200 KW turbogenerators, one recuperated and one not recuperated, the above embodiment can be implemented as a gearless-oilless, direct-drive Permanent Magnet Starter/Generator (PMS/G) at 50,000 rpm. This would result in a much smaller package and a simpler engine having no lube system or gearbox. The MRMPGS approach offers an optimized solution for this integration.

The MRMPGS is also applicable to power generation systems where the prime mover requires variable speed operation for fuel efficiency and a constant output DC voltage. With the embodiment of the present invention described above, the capability of the PM machine is extended to cover the variable-speed constant-voltage DC power-generation system with a simple bridge rectifier.

Unlike prior art applications which implement voltage regulation by controlling the current in the field winding, the machine in the embodiment of the present invention described above is a permanent magnet rotor type without field winding for excitation. This type of machine presents much better reliability as the excitation of the machine is fixed and achieved by a permanent magnet embedded in the rotor assembly. The voltage regulation in such a system is achieved as a speed and load coordination based on a specially selected and calculated machine reactance to achieve compensation between the external voltage variation with the internal machine voltage drop.

Also, the machine in the embodiment of the present invention described above can be of any permanent magnet rotor machine type, and is not required to operate in the saturation region. Therefore, the air gap can be optimized without any restrictions imposed by the regulation coil, and design optimization is achieved through material utilization. Furthermore the machine can be of both axial and radial air gap type and additional windings are not required for achieving voltage regulation. Machines without additional windings and circuits, such as multiple rotors or multiple stators, present much better reliability as the existence of additional windings and circuits increases machine losses and reduces the overall system efficiency.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for providing substantially constant-voltage power for an electric distribution system using a matched reactance power generation system, the method comprising the steps of:

providing a permanent magnet rotor type machine having a selected BEMF value and a selected machine inductance value, wherein an excitation of said machine is fixed and achieved by at least one permanent magnet embedded in a rotor assembly of said machine;

selecting said BEMF value for said machine, wherein said BEMF value is selected at a first machine speed having a line-to-line peak voltage that is equal to a desired terminal voltage of said machine, said BEMF value having substantially equal amplitude to said desired terminal voltage at said first speed and wherein an electrical phase difference between said BEMF value and said terminal voltage is approximately zero;

selecting said machine inductance value for said machine, wherein said machine inductance value is selected based upon both a machine reactance value and a frequency value as a function of a proportional increase in said selected BEMF value between said first machine speed and a second machine speed, wherein the terminal voltage and a phase current are in phase; and controlling said machine speed to provide a substantially constant terminal voltage for a variable power demand level.

2. A method for providing substantially constant-voltage power for an electric distribution system using a matched reactance power generation system as claimed in claim 1, further comprising the step of:

selecting said machine reactance value at said second speed from a vector diagram calculation for reactance including a machine terminal voltage vector and an internal machine voltage drop vector.

3. A method for providing substantially constant-voltage power for an electric distribution system using a matched reactance power generation system as claimed in claim 1 wherein said first machine speed corresponds to a zero delivered power.

4. A method for providing substantially constant-voltage power for an electric distribution system using a matched reactance power generation system as claimed in claim 1 wherein said second machine speed corresponds to a maximum delivered power.

5. A method for providing substantially constant-voltage power for an electric distribution system using a matched reactance power generation system, the method comprising the steps of:

providing a permanent magnet rotor type machine having a selected BEMF value and a selected machine inductance value, wherein an excitation of said machine is fixed and achieved by at least one permanent magnet;

selecting said BEMF value for said machine, wherein said BEMF value is selected at a first machine speed having a line-to-line peak voltage that is equal to a desired terminal voltage of said machine, said BEMF value having substantially equal amplitude to said desired terminal voltage at said first speed and wherein an electrical phase difference between said BEMF value and said terminal voltage is approximately zero;

selecting said machine inductance value for said machine, wherein said machine inductance value is selected as a function of a proportional increase in said selected BEMF value between said first machine speed and a second machine speed, wherein said second machine speed corresponds to a maximum delivered power, wherein said terminal voltage and a phase current are in phase and a resistive component of the machine reactance is zero; and controlling said machine speed to provide a substantially constant terminal voltage for a variable power demand level.

6. A method for providing substantially constant-voltage power for an electric distribution system using a matched reactance power generation system as claimed in claim 5, wherein said machine inductance value is selected further based upon a machine reactance value and a frequency value.

7. A method for providing substantially constant-voltage power for an electric distribution system using a matched reactance power generation system as claimed in claim 5 wherein said at least one permanent magnet is embedded in a rotor assembly of said permanent magnet rotor type machine.

8. A method for providing substantially constant-voltage power for an electric distribution system using a matched reactance power generation system as claimed in claim 5 wherein said first machine speed corresponds to a zero delivered power.

9. A method for providing substantially constant-voltage power for an electric distribution system using a matched reactance power generation system as claimed in claim 5 wherein said second machine speed corresponds to a maximum delivered power.

10. A method for providing substantially constant-voltage power for an electric distribution system using a matched reactance power generation system, the method comprising the steps of:

providing a permanent magnet rotor type machine having a selected BEMF value and a selected machine inductance value, wherein an excitation of said machine is fixed and achieved by at least one permanent magnet;

selecting said BEMF value for said machine, wherein said BEMF value is selected at a first machine speed having a line-to-line peak voltage that is equal to a desired terminal voltage of said machine, said BEMF value having substantially equal amplitude to said desired terminal voltage at said first speed, wherein an electrical phase difference between said BEMF value and said terminal voltage is approximately zero and said first machine speed corresponds to a zero delivered power;

selecting said machine inductance value for said machine, wherein said machine inductance value is selected as a function of a proportional increase in said selected BEMF value between said first machine speed and a second machine speed, wherein said second machine speed corresponds to a maximum delivered power, and wherein said terminal voltage and a phase current are in phase and a resistive component of the machine reactance is zero; and controlling said machine speed to provide a substantially constant terminal voltage for a variable power demand level.

11. A method for providing substantially constant-voltage power for an electric distribution system using a matched reactance power generation system as claimed in claim 10, further comprising the step of:

selecting said machine reactance value at said second speed from a vector diagram calculation for reactance including a machine terminal voltage vector and an internal machine voltage drop vector.

12. A method for providing substantially constant-voltage power for an electric distribution system using a matched reactance power generation system as claimed in claim 10, wherein said machine inductance value is selected further based upon a machine reactance value and a frequency value.

13. A method for providing substantially constant-voltage power for an electric distribution system using a matched reactance power generation system as claimed in claim 10 wherein said at least one permanent magnet is embedded in a rotor assembly of said permanent magnet rotor type machine.

* * * * *